Jan. 30, 1968 D. SEITZER 3,366,890

BROAD-BAND AMPLIFIER

Filed April 23, 1965 2 Sheets-Sheet 1

INVENTOR.
DIETER SEITZER
BY Stephen J. Limanek
ATTORNEY

United States Patent Office 3,366,890
Patented Jan. 30, 1968

3,366,890
BROAD-BAND AMPLIFIER

Dieter Seitzer, Zurich, Switzerland, assignor to International Business Machines Corporation, New York, N.Y., a corporation of New York Filed Apr. 23, 1965, Ser. No. 450,409
Claims priority, application Switzerland, May 4, 1964, 5,828/64
3 Claims. (Cl. 330—24)

ABSTRACT OF THE DISCLOSURE

A broad band amplifier utilizing semiconductor devices the operation of which is insensitive to overloading. The amplifier circuitry includes a non-linear degenerative feedback path in which the degree of degenerative feedback is dependent on the amplitude of the signal being processed such that driving the semiconductor beyond a predetermined value is avoided, this value being below that corresponding to the cut-off or saturation of the semiconductors. The amplifier has, in one instance, a feedback path which consists of a parallel combination of a resistor and a tunnel diode while, in another instance, the feedback path contains a parallel combination of a resistor and a tunnel diode in series with a parallel combination of a capacitor and a zener diode.

Figure 1:
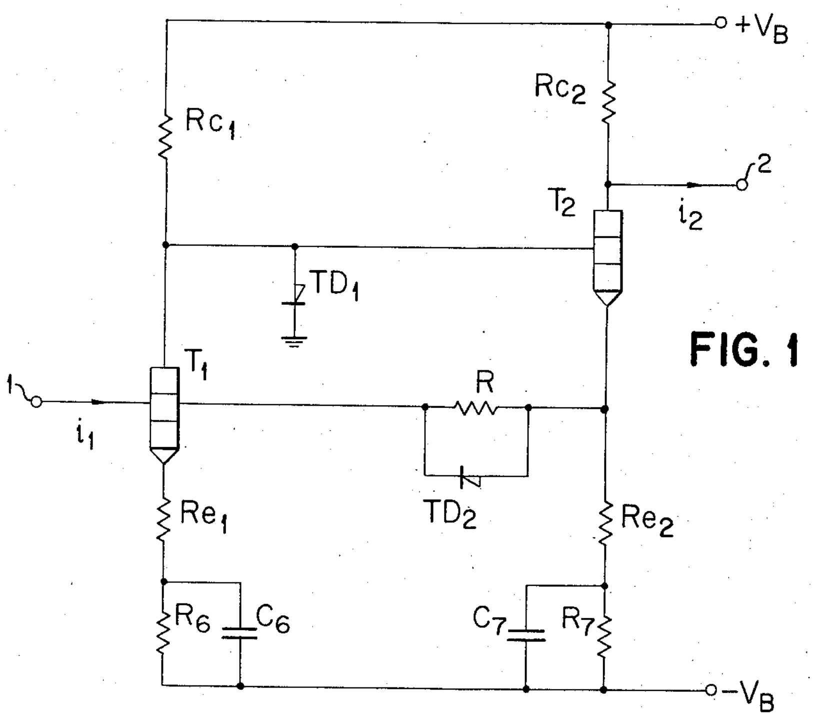

In particular, in reading information stored in a thin magnetic film memory one is, e.g., confronted with the task of conventionally amplifying the desired sense signals of a few millivolt in value on the one hand, and on the other of preventing the disturbing signals caused by a write-in operation, which can easily reach a hundredfold amplitude, from overloading the amplifier and thus making impossible the use of the sense signals. The method of operation of a thin magnetic film memory can be seen in, e.g., commonly assigned U.S. patent application Ser. No. 217, 768, filed Aug. 17, 1962, in which such a memory is described in detail. The rotation of the vectors of magnetization in the memory elements takes place extremely rapidly during a sensing operation, the lapse of time being of the order of nanoseconds. The sense amplifiers associated with the memory must therefore also meet extreme conditions with respect to speed and reliability.

The sense lines in a thin magnetic film memory are generally parallel to the bit lines, so that they are very closely coupled to one another. A somewhat different embodiment of the memory provides for a common bit-drive and sense line, such as is shown in, e.g., IBM Technical Disclosure Bulletin, November 1963, Vol. 6, No. 6, page 58. In both cases disturbing pulses reach the sense line during the write-in operation which are larger by about two orders of magnitude than the voltage signals induced in it owing to the change in magnetic flux in the memory cells during the sensing operation. Thus, if during the cycle time of the write-in operation the very sensitive sense amplifiers are overloaded by the disturbing pulses occurring with a strength a hundred times that of the useful signal, transistors of the amplifiers are saturated with electrically charged particles. The recovery time required by the amplifier before it once more reaches its normal operating condition unfavorably limits the memory cycle time attainable in practice. Means must therefore be provided that either effectively keep the disturbing pulses off the sense amplifier or cause it to become practically immune to overloading.

Such conditions do not exist only in digital computer technology but can be noted in connection with any exchange of information. Disturbing signals of high amplitude within a sequence of information-carrying signals occur in line transmission as well as in wireless transmission. Considerable effort has therefore gone into developing arrangements that can avoid or at least mitigate the unpleasant results of this situation. Recently, as a result of highly developed semiconductor technology, it has been possible to design broad-band amplifiers with semiconductors having frequency limits of up to several hundred megacycles per second. Similarly, progress in miniaturizing and the use of modules permit the accommodation of such amplifiers in the smallest space, and their production at lower cost. Through the considered use of degenerative feedback branches the circuits now known are stable in operation and no longer impose the use of components with rigid tolerances.

In the amplification of broad-band signals or sequences of fast pulses, however, it has not so far been possible to prevent overloading of the amplifiers by undesired high-level disturbing signals. Many cases are conceivable in which an initial amplification-independent limiting of the amplitude is not possible. In case of overloading, both limiting semiconductor diodes and amplifying semiconductor elements are saturated with charged particles, which, owing to the long recovery time needed until normal operating condition is once more reached, significantly hampers, that is, slows down, the "fast" operation of the amplifier. Switching an amplifier "Off" and "On" again when disturbing signals of high amplitude occur is no solution to the problem, since the inertia of the circuits inadmissibly delays this operation. Electronic switches for keeping disturbing signals of high amplitude off the input of an amplifier so that the amplifier is continuously ready for operation when desired signals are applied thereto have another disadvantage. The disturbing signals are in fact kept off the amplifier input, but the amplifier is exposed instead to a current surge caused by the switching "On" operation of the electronic switch. This current surge is practically of the same value as the disturbing signals that the electronic switch can keep off the amplifier input. In other words, the amplifier is overloaded by a transient pulse rather than by a disturbing signal.

It is an object of the present invention to provide a semi-conductor arrangement with optimum amplification properties for the processing of broad-band signals, e.g., fast pulses below a predetermined value in amplitude.

It is a further object of the invention to achieve a limiting of signals above a predetermined value by a suitable choice of degenerative feedback means in an amplifier circuit.

In addition the invention has the main object fully retaining the characteristics necessary for the processing of fast pulses despite limiting of the occurring signals of undesirably high amplitude. This results in an inventive arrangement representing a totally new kind of broad-band amplifier that is actually immune to disturbing signals of high amplitude.

Used as a sense amplifier for a thin magnetic film memory, the proposed invention eases the requirements that the embodiment of the memory on the one hand and a balancing arrangement on the other hand to meet to avoid the bit noise. The balancing arrangement mentioned is described in detail, e.g., commonly assigned U.S. patent application Ser. No. 385,659, filed July 28, 1964.

The invention proposed here also, in sensing signals of a thin magnetic film memory, aims at holding the cycle time to the smallest possible value, owing to the negligibly short recovery time in case of overloading, and so makes use of the rapid switching times of these memories.

Another object of this invention is to provide an electronic broad-band amplifier with semiconductors and degenerative feedback. The invention is characterized by means making the degree of degenerative feedback dependent upon the amplitude of the signal to be processed, so that driving the semiconductors beyond a predetermined value is avoided, this value being below that corresponding to the cut-off or saturation of the semiconductors.

The invented broad-band amplifier is described in greater detail in the following with the aid of the drawings. The circuit diagrams of these show two preferred embodiments.

Figure 2:
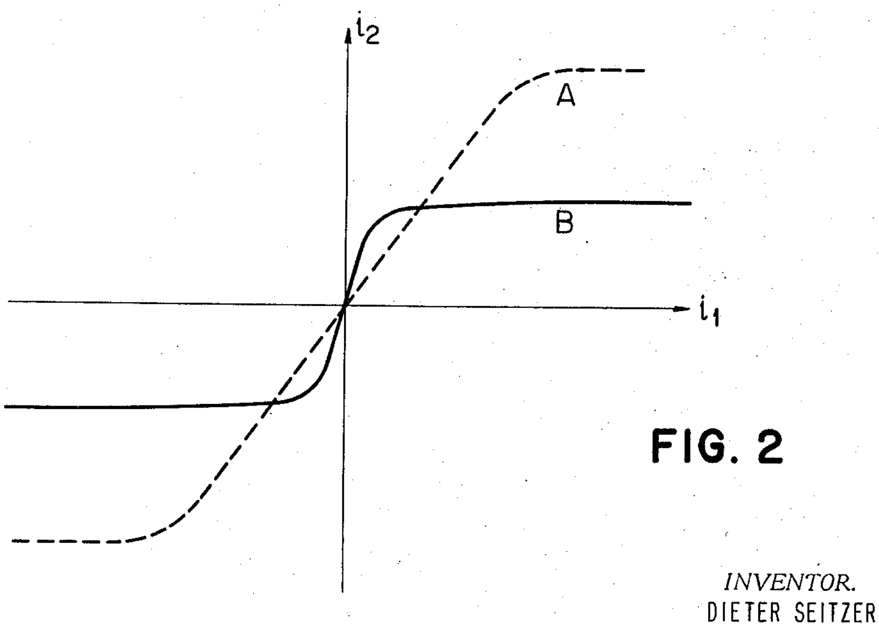
Figure 3:
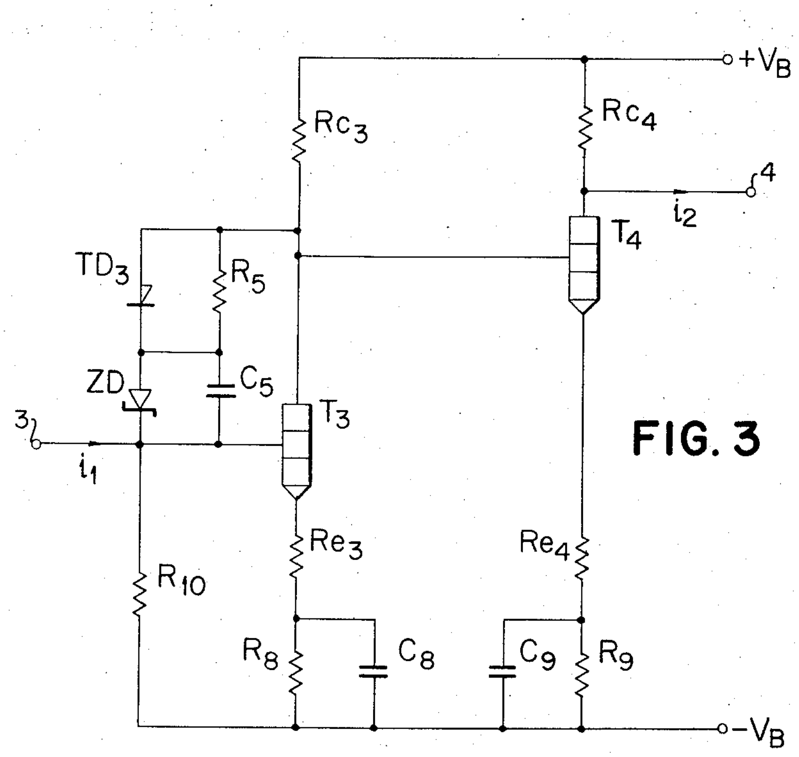
Figure 4:
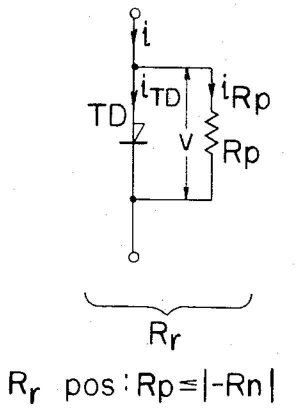
Figure 5:
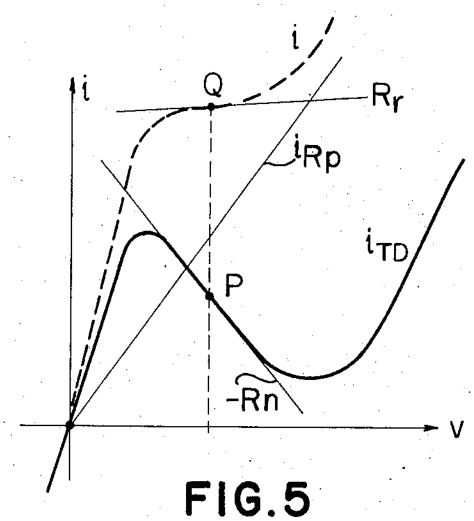

In the drawings:

FIG. 1 illustrates a first embodiment of the broad-band amplifier,

FIG. 2 indicates the behavior of the broad-band amplifier with and without tunnel diodes, FIG. 3 illustrates a second embodiment of the broad-band amplifier, FIG. 4 indicates the effect of connecting in parallel a tunnel diode and an ohmic resistance, and FIG. 5 illustrates the effect of the above parallel connection in graphic representation.

The circuit diagram of FIG. 1 illustrates a broad-band amplifier having a cascade of two semiconductor stages in a grounded-emitter type circuit. The significant characteristics of this circuit are: direct, i.e., galvanic, connection of the first to the second stage; and, a degenerative feedback branch, that essentially determines the function of the entire amplifier, connected from the emitter of a second semiconductor $T_2$ to the base of a first semiconductor $T_1$. A signal $i_1$ to be processed is applied to input terminal 1 and thus reaches the base connection of semiconductor $T_1$, while an output signal $i_2$ is taken from output terminal 2 which is directly connected to the collector of semiconductor $T_2$.

The first semiconductor $T_1$, for whose representation in FIG. 1 the symbol of an NPN transistor was chosen, is connected to the negative terminal $-V_B$ of a voltage supply source not shown, via an emitter resistor $Re_1$ and a resistor paralleled by a capacitor $R_6$–$C_6$. The voltage supply circuit is closed with the connection of the collector of $T_1$, via a collector resistor $Rc_1$, to the positive terminal $+V_B$ of the same voltage supply source. A second collector connection leads through a tunnel diode $TD_1$ to ground. The signal processed by $T_1$ is taken from the collector lead and then, via a third collector connection, galvanically or directly supplied to the base of semiconductor $T_2$, which again is represented by an NPN transistor symbol. The emitter lead of $T_2$, similar to that of $T_1$, is connected to the terminal $-V_B$ of the voltage supply source via an emitter resistor $Re_2$ and a resistor paralleled by a capacitor $R_7$–$C_7$. The collector lead of transistor $T_2$ is connected to terminal $+V_B$ of the same source via collector resistor $Rc_2$. The last and essential element of this circuit arrangement is a degenerative feedback branch that leads back from the emitter terminal of transistor $T_2$ to the base connection of transistor $T_1$ and thus also to the input terminal 1 of the entire amplifier circuit. The degenerative feedback branch includes the ohmic resistance R paralleled by a tunnel diode $TD_2$. Signal $i_2$ to be taken from output terminal 2 reaches it directly from the collector terminal of transistor $T_2$.

To understand the operation of the circuit arrangement of FIG. 1 it is advisable to keep in mind the various operating conditions to be described. It should be mentioned at the outset that the two parallel combinations in the emitter circuits $R_6$–$C_6$ and $R_7$–$C_7$ serve exclusively for setting the operating point of transistors $T_1$ and $T_2$, respectively, as close to the center of the active domain of their characteristic as possible. This is that region in which transistors $T_1$ and $T_2$ actually function as fast-operating elements, which are essential in a broad-band amplifier of high quality. Tunnel diode $TD_1$ in the zero-signal condition operates approximately in the center of its negative characteristic. It thus represents a negative resistance whose value is designed $|-Rn_1|$. The ohmic resistance of the collector resistor $Rc_1$ chosen is approximately equal to this negative resistance.

FIGS. 4 and 5 show graphically how such a parallel combination in its selected operating point corresponds to a resulting total resistance whose value $R_r$ is positive when the ohmic resistance $Rp$ parallel to the tunnel diode is less than or equal to the negative resistance value $|-Rn|$ of the diode. The total critical resistance $R_r$, i.e., when the individual values are equal, becomes infinitely large. Now since tunnel diode $TD_1$ and resistor $Rc_1$ are connected in parallel as regards the transistor output, the collector resistance value of transistor $T_1$ becomes higher than $Rc_1$ alone without tunnel diode $TD_1$. Emitter resistor $Re_1$ effects a degenerative current feedback of the first amplifier stage and has the extremely important role of extending its rated input swing.

The second amplifier stage with transistor $T_2$ at its base connection, which is parallel to the combination $Rc_1$, $TD_1$, presents a high impedance, due to the degenerative current feedback by the emitter resistor $Re_2$. Here too the presence of this resistor permits the extension of the rated input swing for transistor $T_2$. The operating condition for the degenerative feedback branch between the emitter of $T_2$ and the base of $T_1$, that is, R paralleled by $TD_2$, corresponds precisely to the situation graphically shown in FIGS. 4 and 5 and elucidated above. Ohmic resistance R is chosen approximately equal to the negative resistance value $|-Rn_2|$ of tunnel diode $TD_2$. In the no-signal state there is thus a high positive total resistance between the emitter of $T_2$ and the base of $T_1$. It should be noted that the resistance value in this branch determines the degree of degenerative feedback from $T_2$ to $T_1$. In other words the high resistance in the no-signal state at this point in the circuit means that the circuit arrangement in this state has low degenerative feedback from the second to the first stage. The signal fed back from the emitter of $T_2$ to the base of $T_1$ is shifted by 180° in its phase with respect to the input signal, which meets an important requirement for the proper functioning of the degenerative feedback.

The circuit arrangement shown in FIG. 1 as described above meets very closely the strict requirements valid for a broad-band amplifier that must be insensitive to overloading. The behavior of the amplifier is shown in the diagram of FIG. 2. The broken line of curve A corresponds to the behaviour without tunnel diodes $TD_1$, $TD_2$ in an otherwise identical circuit, while the solid line of curve B represents the operating characteristic of the amplifier with tunnel diodes. Curve A shows that in the circuit without tunnel diodes small signals are linearly amplified, while large ones undergo limiting due to overloading of the transistors. The overloading results in nothing less than saturation of the semiconductor elements by charged particles and means that the dynamic input drive reaches current saturation or cut-off. This circumstance causes limiting of the output signal as well as a noticeable slowing down in operation. When overdriven the transistors require a long recovery time until normal operating conditions are once more reached, so that they are no longer capable of correctly processing pulse signals. The signals would at least be distorted, and some partly or wholly suppressed. To prevent a "slowing down" of the amplifier, then, the input signal must under no condition reach such a value that a limiting as in curve A takes place. It is worth mentioning here that in the emitter circuits of the arrangement according to FIG. 1, limiting would take place much sooner without the degenerative current feedback caused by resistors $Re_1$ and $Re_2$.

Curve B shows the behavior of the circuit of the invention including tunnel diodes $TD_1$ and $TD_2$. It can be seen that the amplification factor for small signals has risen noticeably. This effect is partly due to the insertion of tunnel diode $TD_1$ in the collector circuit of transistor $T_1$. As was described above and illustrated in FIGS. 4 and 5, this measure produces an increase in the collector impedance of $T_1$ which is reflected by an increase in the amplification factor of this stage. Inserting tunnel diode $TD_2$ also supports the increase in amplification since, as was mentioned above, it influence the degree of degenerative feedback in the branch between transistors $T_2$ and $T_1$. The resistance resulting from the parallel connection of R and $TD_1$ under the operating conditions described earlier is higher than the value of R alone. The degree of degenerative feedback in this branch therefore drops, which in turn causes an increase in amplification. As can further be seen from curve B in FIG. 2, limiting of the signals now takes place much sooner than in curve A. It takes place long before the semiconductor elements are saturated by charged particles and is due entirely to the effect of the tunnel diodes. FIG. 5 shows that the differential resistance $-Rn$ of a tunnel diode is negative and constant only in a rather limited range. When the negative portion of the characteristic around the operating point P is strongly overdriven on both sides, this resistance will first go to negative infinity, then change to positive values, and finally tend toward a rather low positive limit. The behavior of the tunnel diode is bipolar, i.e., the foregoing holds for an input drive in the positive as well as the negative direction.

It must be considered that parallel to the tunnel diodes in FIG. 1 there are ohmic resistances, so that the resulting total resistances follow the differential resistances of the tunnel diodes, now varying under the influence of overloading, which amounts to a considerable decrease in the previous values. With a wide input swing tunnel diode $TD_1$ causes a decrease of the collector impedance of $T_1$, which means less amplification in this stage. $TD_2$, however, is the prime cause of the limiter effect by lowering the resistance in the degenerative feedback branch between $T_2$ and $T_1$. The degree of degenerative feedback is thus multiplied several times and the input impedance of the entire amplifier simultaneously reduced. This amplifier input impedance results from the connection of the base input of transistor $T_1$ with the parallel combination R, $TD_2$ of the degenerative feedback branch. It should be added here that without the degenerative feedback branch transistor $T_1$, due to its own emitter resistor $Re_1$ and the resulting degenerative current feedback, would show a relatively high input impedance at input terminal 1. The inserted degenerative feedback branch comprising tunnel diode $TD_2$, however, reduces this to a smaller value already under no-signal conditions, and considerably more so in case of overloading. In contrast with the foregoing, the impedances of transistor $T_2$ are not significantly affected by the amplitude of the driving power; in particular, the output impedance at output terminal 2 remains relatively high.

The behavior of the circuit arrangement according to FIG. 1, whose current amplification is shown by the solid line of curve B in FIG. 2, can be summarized as follows. Small signals at input terminal 1 are amplified linearly. Limiting occurs for signals upward of a certain amplitude. This threshold depends essentially on the characteristics of the tunnel diodes used. Owing to the bipolar quality of the diode characteristics, as shown in FIG. 5, the limiting holds for both positive and negative driving power. Limiting is merely a consequence of the presence of tunnel diodes, with $TD_2$ in the leading role. Tunnel diode $TD_1$ could be omitted without significant loss in the end result. Limiting of the signals begins long before saturation or cut-off is reached in overloading the transistors $T_1$ and $T_2$. These two semiconductor elements operate at all times in the active domain of their characteristics and are thus always capable of processing fast pulses without being impeded by overloading of short duration. The tunnel diodes do not allow a "slow-down" of the amplifier on account of long recovery times due to overloading. On the contrary, they cause a "speed-up" by decreasing the input impedance at terminal 1 and the collector impedance of transistor $T_1$. It need only be added that the proposed arrangement operates best when it is fed by a signal source of high internal resistance and connected to a load of low resistance. In semiconductor technique and under the conditions described here this is normal.

The broad-band amplifier according to FIG. 1 has been constructed and tested, and it was found that the values of the individual parts are relatively uncritical and that stable, correct operation can be achieved easily. The amplification figure under operating conditions approximates 10, and small signals of the order of several millivolts are handled. Pulse repetition frequencies of 75 megacycles per second for pulses with a rise time of 3 nanoseconds have been reached. Due to the negligibly small recovery time, the amplifier is practically immune to disturbing signals of high amplitude. When used as a sense amplifier for a thin magnetic film memory, a read-out cycle time of approximately 15 nanoseconds is achieved. A sense signal can be correctly processed some 60 nanoseconds after appearance of a bit-drive pulse approximately a hundred times as large. With this no limits are set, however, to finding other uses for this broad-band amplifier.

Without departing from the basic idea of the invention, the circuit arrangement shown in FIG. 1 can be modified in various ways. It is possible, for instance, to choose a basic construction of more than two amplifier stages. A limiting factor is that the degenerative feedback branch is subject to certain phase requirements, which is also true for the amplifier in general, since stable operation must be ensured. Then, semiconductor stages not of the grounded-emitter type can be used. For example, output terminal 2 can be connected to the emitter of $T_2$, and resistor $Rc_2$ omitted. The second stage would then have become a grounded-collector circuit and with its low output impedance would thus be suitable for feeding a highly resistive load. Everything else would remain unchanged. Furthermore, the use of transistors is not essential. The basic principle of the present invention can be implemented with any kind of active amplifying element, semiconductor or not, having two, three, or more differently doped zones of conductivity. The NPN transistors shown in the proposed arrangement can equally well be replaced by those of the PNP type, keeping in mind the necessity of reversing the polarity of the supply voltage $V_B$. A polarity reversal of the tunnel diodes in this case is not absolutely necessary. Due to their bipolar characteristic, the functions of $TD_1$ and $TD_2$ are retained with any polarization, provided that the choice of the remaining circuit components permits setting the correct operating conditions. If the amplification of the arrangement shown in FIG. 1 is insufficient, then a cascade of such amplifiers can be formed without detriment to the functional characteristics.

The broad-band amplifier shown in FIG. 3 represents a further preferred embodiment of the inventive principle. The basic design with two amplifier stages is the same as that in FIG. 1, and the function of current amplification is identical with that shown in FIG. 2. The description of the arrangement thus confines itself to those details that depart from FIG. 1. The following elements correspond to each other in every respect and are therefore not separately considered later: $Rc_1$ and $Rc_3$, $Re_1$ and $Re_3$, $R_6$–$C_6$ and $R_8$–$C_8$, $Rc_2$ and $Rc_4$, $Re_2$ and $Re_4$, $R_7$–$C_7$ and $R_9$–$C_9$, $T_2$ and $T_4$, input terminals 1 and 3, and output terminals 2 and 4. In the arrangement of FIG. 3, mainly the degenerative feedback branch between the two transistor stages is missing, as is the tunnel diode which was connected from the collector of the first transistor to ground.

The degenerative feedback circuit of FIG. 3 leads from the collector of transistor $T_3$, through tunnel diode $TD_3$ paralleled by resistor $R_5$, to the Zener diode ZD which is paralleled by capacitor $C_5$, and from there to the connection of input terminal 3 with the base of transistor $T_3$. The direct current path from this base connection to the negative terminal $-V_B$ of the voltage supply source is closed by resistor $R_{10}$. Tunnel diode $TD_3$ cooperates as usual with resistor $R_5$. The voltage drop occurring with this combination between base and collector of transistor $T_3$ does not allow $T_3$ to operate in its active range, therefore, the Zener diode ZD is inserted, which maintains the correct operating voltage at this point. The capacitor $C_5$ bypasses the Zener diode for alternating current energy. The direct current passing through this degenerative feedback branch is higher than the base current flowing into transistor $T_3$. Resistor $R_{10}$ is therefore inserted as shown and its value suitably chosen so that the appropriate operating conditions of the tunnel diode in the negative part of the characteristic are set. The resistor $R_5$ is made approximately equal to $|-Rn_3|$, the resistance value of the tunnel diode $TD_3$. Thus with small and large driving signals, the degree of degenerative feedback becomes small and large, respectively, making the amplication figure of transistor $T_3$ large and small accordingly. Thus one tunnel diode $TD_3$ here assumes all functions that in the arrangement of FIG. 1 were performed jointly by $TD_1$ and $TD_2$. The operation of this amplifier too becomes "faster" with higher input signals. Since the internal resistance of $T_3$ is largely dependent upon the input swing, it is separated by transistor $T_4$ from the output terminal 4. There again, a constant high output impedance appears. The advantage of the circuit of FIG. 3 consists primarily in somewhat simplified operating adjustment and in a reduced expense by omitting one tunnel diode. All basic considerations mentioned above that apply to variations of the arrangement of FIG. 1 are valid for the design of FIG. 3.

In conclusion an improvement is outlined in the circuit of FIG. 1 that is based on experience with the arrangement just described. The choice of a favorable operating point of transistor $T_1$ can be facilitated by adding a Zener diode with a bypassing capacitor, this being indispensable in FIG. 3. This advantageous addition should preferably be made in the emitter connection from $T_2$ to R, $TD_2$ and $Re_2$, since proper functioning of the Zener diode is ensured by an adequate current flow at this point. The operation of $T_2$ remains unaffected, while $T_1$ gets higher operating voltages which permit displacing the operating point further into the active range of its characteristic. The "speed" of $T_1$ is thus increased and the risk of saturation by charged particles reduced.

While the invention has been particularly shown and described with reference to preferred embodiments thereof, it will be understood by those skilled in the art that various changes in form and details may be made therein without departing from the spirit and scope of the invention.

What is claimed is:

1. An amplifier comprising a first transistor having a base electrode and a collector electrode, an input circuit coupled to said base electrode, a second transistor, means for coupling said collector electrode to said second transistor, a degenerative feedback circuit coupled from said collector electrode to said base electrode, said feedback circuit including a first parallel combination of a resistor and a tunnel diode biased in its negative resistance region and a second parallel combination of a capacitor and a Zener diode serially connected to said first combination and an output circuit coupled to said second transistor.

2. A combination comprising semiconductor amplifying means having an input and an output circuit, nonlinear degenerative feedback means coupled from said output circuit to said input circuit which includes a tunnel diode biased in its negative resistance region and a resistor connected in parallel with said diode, a Zener diode and a capacitor connected in parallel with said Zener diode, the parallel combination of said Zener diode and said capacitor being serially connected with the parallel combination of said tunnel diode and said resistor, said degenerative feedback means being responsive to the amplitude of signals in said amplifying means so as to vary the degree of degenerative feedback, whereby said amplifying means is not driven beyond a predetermined value lying below that corresponding to saturation of said semiconductor amplifying means.

3. A combination comprising semiconductor amplifying means having an input and output circuit, said amplifying means including a first transistor having a base electrode, a second transistor coupled to said output circuit having an emitter electrode non-linear degenerative feedback means including a tunnel diode biased in its negative resistance region and a resistor connected in parallel with said diode connected between said emitter and said base electrodes said output circuit including a second resistor and a second tunnel diode biased in its negative resistance region connected for alternating current in parallel with said second resistor, said degenerative feedback means being responsive to the amplitude of signals in said amplifying means so as to vary the degree of degenerative feedback, whereby said amplifying means is not driven beyond a predetermined value lying below that corresponding to saturation of said amplifying means.

References Cited

UNITED STATES PATENTS

| | | | |
|---|---|---|---|
| 3,034,119 | 5/1962 | Durbin et al. | 330—97 X |
| 3,092,729 | 6/1963 | Cray | 330—110 X |
| 3,094,675 | 6/1963 | Ule | 330—110 |
| 3,127,526 | 3/1964 | Bishop | 330—110 X |

ROY LAKE, *Primary Examiner.*

L. J. DAHL, *Assistant Examiner.*